United States Patent [19]
Saito et al.

[11] Patent Number: 5,959,037
[45] Date of Patent: *Sep. 28, 1999

[54] ACRYLIC COPOLYMER ELASTOMER, ITS BLEND RUBBER AND BLEND RUBBER COMPOSITION

[75] Inventors: Kuniyoshi Saito, Iwaki; Iwao Moriyama, Takahagi; Jun Okabe, Kitaibaraki, all of Japan

[73] Assignee: Nippon Mektron, Limited, Tokyo, Japan

[*] Notice: This patent is subject to a terminal disclaimer.

[21] Appl. No.: 08/692,686

[22] Filed: Aug. 6, 1996

[30] Foreign Application Priority Data

Aug. 31, 1995 [JP] Japan .................................. 7-246784

[51] Int. Cl.$^6$ ........................... C08L 27/12; C08L 15/02; C08L 33/14

[52] U.S. Cl. ................... 525/199; 525/205; 525/222; 525/223; 525/225; 525/378; 525/386; 526/279; 526/320

[58] Field of Search ..................... 525/199, 205, 525/222, 225, 378, 386; 526/279, 320

[56] References Cited

U.S. PATENT DOCUMENTS

| | | |
|---|---|---|
| 3,497,571 | 2/1970 | Tellier et al. . |
| 5,744,562 | 4/1998 | Saito ........................................ 526/279 |

FOREIGN PATENT DOCUMENTS

| | | |
|---|---|---|
| 108 372 | 5/1984 | European Pat. Off. . |
| 1 456 738 | 1/1967 | France . |
| 57-185236 | 11/1982 | Japan . |
| 59-23577 | 6/1984 | Japan . |
| 60-67446 | 4/1985 | Japan . |
| 4-45126 | 2/1992 | Japan . |
| 06145105 | 5/1994 | Japan . |
| 06145257 | 5/1994 | Japan . |
| 540 940 | 10/1973 | Switzerland . |

Primary Examiner—Fred Zitomer
Attorney, Agent, or Firm—Kenyon & Kenyon

[57] ABSTRACT

A novel acrylic copolymer elastomer comprising [I] an alkyl acrylate; [II] (a) $CH_a=CRCOOR_2OCOR_1$, (b) $CH_2=CRCO[O(CH_2)pCO]qOR_1$ or (c) $CH_2=CRCOOR_2[CO(CH_2)pO]qCOR_1$; and [III] (1) $CH_2=CRCOO(CH_2)nPhOR'$, (2) $CH_2=CRCOO(CH_2)nOCO(CH_2)mPhOR'$, (3) $CH_2=CHOCO(CH_2)mPhOR'$, (4) $CH_2=CHOCO(CH_2)nOCO(CH_2)mPhOR'$, (5) $CH_2=CHO(CH_2)nOCO(CH_2)mPhOR'$ or (6) $CH_2=CHPh(CH_2)nOCO(CH_2)mPhOR'$ where R is a hydrogen atom or a methyl group, $R_1$ is an alkyl group, $R_2$ is an alkylene group, R' is a hydrogen atom, an acyl group or a trialkylsilyl group and Ph is a phenylene group, provides a blend rubber having an improved cold resistance and an intermediate heat resistance between the heat resistance of acrylic copolymer elastomer and that of fluorine-containing elastomer, when blended with the fluorine-containing elastomer.

10 Claims, No Drawings

ACRYLIC COPOLYMER ELASTOMER, ITS BLEND RUBBER AND BLEND RUBBER COMPOSITION

BACKGROUND OF THE INVENTION

1. Field of the Invention

The present invention relates to a novel acrylic copolymer elastomer, its blend rubber and a vulcanizable blend rubber composition, and more particularly to an acrylic copolymer, elastomer blendable with a fluorine-containing elastomer, a blend rubber of the acrylic copolymer elastomer and a fluorine-containing elastomer, and a vulcanizable blend rubber composition.

2. Related Prior Art

Acrylic copolymer elastomers (acrylic rubber) have good oil resistance and heat resistance and are cheap, and thus have been widely used as vulcanization-molding materials such as automobile sealing materials, etc. Due to recent higher efficiency of automobile engines and consequent higher temperature in the use circumstances, materials of much higher heat-resistance are in demand.

Fluorine-containing elastomers (fluorine rubber), on the other hand, are used particularly at positions requiring a higher heat resistance among the automobile engine sealing materials owing to their distinguished heat resistance, but are very expensive. Furthermore, the fluorine rubber has a poor cold resistance as another disadvantage, which should be improved.

In these situations, many attempts have been also made to blend acrylic rubber with fluorine rubber, thereby satisfying the required heat resistance and cost at the same time, but the conventional technique of cross-linking these two rubbers by a cocross-linking agent capable of cocross-linking these two rubbers can hardly satisfy even the intermediate heat resistance between the heat resistance of acrylic rubber and that of fluorine-containing, and no satisfactory cold resistance has been obtained yet.

SUMMARY OF THE INVENTION

An object of the present invention is to provide a novel acrylic copolymer elastomer blendable with a fluorine-containing elastomer, which can give a blend rubber having an intermediate heat resistance between the heat resistance of acrylic copolymer elastomer and that of fluorine-containing elastomer, when blended with the fluorine-containing elastomer, and also improved cold resistance.

Another object of the present invention is to provide a blend rubber comprising such a acrylic copolymer elastomer as above and a fluorine-containing elastomer, and also provide its vulcanizable composition.

DETAILED DESCRIPTION OF THE INVENTION

According to the present invention, there is provided an acrylic copolymer elastomer, which comprises a copolymer of:

[I] an alkyl acrylate having an alkyl group having 1 to 8 carbon atoms;

[II]
(a) an acylated ω-hydroxyalkyl (meth)acrylate, represented by the following general formula:

where R is a hydrogen atom or a methyl group; $R_1$ is a lower alkyl group; and $R_2$ is an alkylene group having 2 to 20 carbon atoms, (b) a terminally alkylated (meth)acrylic acid lactone ester, represented by the following general formula:

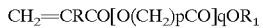

where R is a hydrogen atom or a methyl group; $R_1$ is a lower alkyl group; p is an integer of 2 to 20; and q is an integer of 1 to 20, or (c) a terminally acylated (meth)acrylic acid lactone ester, represented by the following general formula:

where R is a hydrogen atom or a methyl group; $R_1$ is a lower alkyl group; $R_2$ is an alkylene group having 2 to 20 carbon atoms, p is an integer of 2 to 20; and q is an integer of 1 to 20; and

[III] an unsaturated ester compound having a hydroxyphenyl group, an acetoxyphenyl group or a trialkylsilyloxy group as a terminal group.

The acrylic copolymer elastomer can be formed into a blend rubber together with a fluorine-containing elastomer, and the blend rubber can be formed into a vulcanizable composition by adding a quaternary onium compound and an acid acceptor thereto.

The present novel acrylic copolymer elastomer comprises, as the main component, an alkyl acrylate having an alkyl group having 1 to 8 carbon atoms. The alkyl acrylate for use in the present invention includes not only alkyl acrylates, whose alkyl group is methyl, ethyl, n-propyl, isopropyl, n-butyl, isobutyl, n-amyl, n-hexyl, 2-ethylhexyl, n-octyl, etc., but also alkyl acrylates having a substituted alkyl group, such as 2-cyanoethyl acrylate, etc. Preferably, ethyl acrylate or n-butyl acrylate is used in the copolymerization reaction in an amount of about 30 to about 98.9% by weight, preferably about 60 to about 94.5% by weight, on the basis of the copolymer. At least two of these alkyl acrylates can be used together.

The above-mentioned component (a), (b) or (c) is used in the copolymerization with the alkyl acrylate in an amount of about 1 to about 50% by weight, preferably about 5 to about 30% by weight, on the basis of the copolymer, and can be synthesized in the following manner:

Component (a) can be readily prepared by the ordinary acylation method of allowing an ω-hydroxyalkyl (meth)acrylate to react with a lower saturated aliphatic carboxylic acid anhydride or halide, or by condensation reaction of lower alkylene glycol monoacyl ester with (meth)acrylic acid halide.

Component (b) can be readily prepared by allowing (meth)acrylic acid to react with a lactone such as δ-butyrolactone, ε-caprolactone, etc. or their polymers (including oligonomers) in the presence of an acidic catalyst to obtain an (meth) acrylic acid lactone ester having terminal carboxyl group, represented by the following general formula:

(see JP-A-60-67446 and JP-A-4-45126), followed by reaction with a lower alcohol in the presence of a dehydrating catalyst such as p-toluenesulfonic acid, etc., or can be also prepared by condensation reaction with a lower alkyl halide.

Component (c) can be prepared by allowing ω-hydroxyalkyl-(meth)acrylate to react with a lactone in the presence of a stannous halide catalyst or the like to obtain a compound having the following general formula:

(see JP-B-63-66307), followed by acylation of the terminal hydroxy group, and can be also prepared by further transesterification of the resulting terminal ester group with other esters. Specifically, component (c) include the following compounds (see JP-A-6-145105 and JP-A-6-145257):

CH$_2$=CHCOOC$_2$H$_4$O[CO(CH$_2$)$_5$O]COCH$_3$
CH$_2$=CHCOOC$_2$H$_4$O[CO(CH$_2$)$_5$O]COC$_2$H$_5$
CH$_2$=CHCOOC$_2$H$_4$O[CO(CH$_2$)$_5$O]$_2$COCH$_3$
CH$_2$=CHCOOC$_2$H$_4$O[CO(CH$_2$)$_5$O]$_2$COC$_2$H$_5$
CH$_2$=CHCOOC$_2$H$_4$O[CO(CH$_2$)$_5$O]$_3$COCH$_3$
CH$_2$=CHCOOC$_2$H$_4$O[CO(CH$_2$)$_5$O]$_3$COC$_2$H$_5$
CH$_2$=C(CH$_3$)COOC$_2$H$_4$O[CO(CH$_2$)$_5$O]COCH$_3$
CH$_2$=C(CH$_3$)COOC$_2$H$_4$O[CO(CH$_2$)$_5$O]COC$_2$H$_5$
CH$_2$=C(CH$_3$)COOC$_2$H$_4$O[CO(CH$_2$)$_5$O]$_2$COCH$_3$
CH$_2$=C(CH$_3$)COOC$_2$H$_4$O[CO(CH$_2$)$_5$O]$_2$COC$_2$H$_5$
CH$_2$=C(CH$_3$)COOC$_2$H$_4$O[CO(CH$_2$)$_5$O]$_3$COCH$_3$
CH$_2$=C(CH$_3$)COOC$_2$H$_4$O[CO(CH$_2$)$_5$O]$_3$COC$_2$H$_5$
CH$_2$=CHCOOC$_2$H$_4$O[CO(CH$_2$)$_3$O]COCH$_3$
CH$_2$=CHCOOC$_2$H$_4$O[CO(CH$_2$)$_3$O]COC$_2$H$_5$
CH$_2$=CHCOOC$_2$H$_4$O[CO(CH$_2$)$_4$O]COCH$_3$
CH$_2$=CHCOOC$_2$H$_4$O[CO(CH$_2$)$_4$O]COC$_2$H$_5$
CH$_2$=CHCOOC$_3$H$_6$O[CO(CH$_2$)$_3$O]COCH$_3$
CH$_2$=CHCOOC$_3$H$_6$O[CO(CH$_2$)$_3$O]COC$_2$H$_5$
CH$_2$=CHCOOC$_3$H$_6$O[CO(CH$_2$)$_4$O]COCH$_3$
CH$_2$=CHCOOC$_3$H$_6$O[CO(CH$_2$)$_4$O]COC$_2$H$_5$
CH$_2$=CHCOOC$_3$H$_6$O[CO(CH$_2$)$_5$O]COCH$_3$
CH$_2$=CHCOOC$_3$H$_6$O[CO(CH$_2$)$_5$O]COC$_2$H$_5$
CH$_2$=CHCOOC$_4$H$_8$O[CO(CH$_2$)$_3$O]COCH$_3$
CH$_2$=CHCOOC$_4$H$_8$O[CO(CH$_2$)$_3$O]COC$_2$H$_5$
CH$_2$=CHCOOC$_4$H$_8$O[CO(CH$_2$)$_4$O]COCH$_3$
CH$_2$=CHCOOC$_4$H$_8$O[CO(CH$_2$)$_4$O]COC$_2$H$_5$
CH$_2$=CHCOOC$_4$H$_8$O[CO(CH$_2$)$_5$O]COCH$_3$
CH$_2$=CHCOOC$_4$H$_8$O[CO(CH$_2$)$_5$O]COC$_2$H$_5$

The unsaturated ester compound having a hydroxyphenyl group, an acetoxyphenyl group or a trialkylsilyloxy group as a terminal group is used in the copolymerization in an amount of about 0.1 to about 20% by weight, preferably about 0.5 to about 10% by weight and includes compounds represented by the following general formulae:

CH$_2$=CRCOO(CH$_2$)nPhOR'  (1)

CH$_2$=CRCOO(CH$_2$)nOCO(CH$_2$)mPhOR'  (2)

CH$_2$=CHOCO(CH$_2$)mPhOR'  (3)

CH$_2$=CHOCO(CH$_2$)nOCO(CH$_2$)mPhOR'  (4)

CH$_2$=CHO(CH$_2$)nOCO(CH$_2$)mPhOR'  (5)

CH$_2$=CHPh(CH$_2$)nOCO(CH$_2$)mPhOR'  (6)

where
R: hydrogen atom or a methyl group
R': hydrogen atom, an acyl group or a trialkylsilyl group
Ph: a phenylene group, preferably a p-phenylene group, the phenylene group may have an alkyl group, an alkoxyl group, an alkoxyalkyl group, etc. as a substituent group
n: an integer of 1 to 6
m: 0 or an integer of 1 to 3

These compounds are synthesized in the following manner:

CH$_2$=CRCOX+HO(CH$_2$)nPhOH→CH$_2$=CRCOO(CH$_2$)nPhOH
(X: halogen atom)  (1)

This reaction can be carried out as a condensation reaction of (meth)acrylic acid halide with 4-hydroxybenzyl alcohol, 4-hydroxyphenetyl alcohol or the like in the presence of a catalyst such as triethylamine or the like.

HO(CH$_2$)nPhOH→CH$_2$=CRCOO(CH$_2$)nPhOR'

This reaction can be carried out under the reaction conditions for the ordinary acylation reaction or trialkylsilylation reaction by adding to 4-hydroxybenzyl alcohol, 4-hydroxyphenetyl alcohol or the like an acylating agent, for example, an acid anhydride such as acetic anhydride, propionic anhydride, butyric anhydride, etc., or an acid halide such as acetyl halide, propionyl halide, butryl halide, etc., or trialkylhalogenosilane such as trimethylhalogenosilane, triethylhalogenosilane, etc.

Or, the synthesis can be carried out through a direct condensation reaction, using 4-acetoxybenzyl alcohol, etc. as a raw material, as given by the following reaction equation:

CH$_2$=CRCOX+HO(CH$_2$)nPhOR'→CH$_2$=CRCO(CH$_2$)nPhOR'
(X: halogen atom)

CH$_2$=CRCOO(CH$_2$)nOH+HOCO(CH$_2$)mPhOH→
CH$_2$=CRCOO(CH$_2$)nOCO(CH$_2$)mPhOH  (2)

This reaction can be carried out as a condensation reaction of ω-hydroxyalkyl (meth)acrylate with 4-hydroxybenzoic acid, 4-hydroxyphenylacetic acid or the like in the presence of a dehydrating agent such as N,N'-cyclohexylcarbodiimide or the like. The reaction can be also carried out as a dehydrohalogenation reaction using an acid halide of 4-hydroxybenzoic acid, 4-hydroxyphenylacetic acid or the like in place of these acids. Then, the reaction for —PhOH→—PhOR' can be carried out in the same manner as in (1).

CH$_2$=CHOCOCH$_3$+HOCO(CH$_2$)mPhOH→
CH$_2$=CHOCO(CH$_2$)mPhOH  (3)

Synthesis can be carried out by transesterification of a vinyl carboxylate ester, typical of which is vinyl acetate, with 4-hydroxybenzoic acid, 4-hydroxyphenylacetic acid, etc. in the presence of a catalyst of palladium acetate and potassium acetate, etc. Successively, reaction for —PhOH→—PhOR' can be carried out in the same manner as in (1).

CH$_2$=CHOCO(CH$_2$)nX+HOCO(CH$_2$)mPhOH→
CH$_2$=CHOCO(CH$_2$)nOCO(CH$_2$)mPhOH (X: halogen atom)(4)

Synthesis can be carried out as a condensation reaction of vinyl monohalogenocarboxylate such as vinyl monochloroacetate with 4-hydroxybenzoic acid, 4-hydroxyphenylacetic acid or the like in the presence of a triethylamine catalyst, etc. Then, the reaction for —PhOH→—PhOR' can be carried out in the same manner as in (1).

CH$_2$=CHO(CH$_2$)nX+HOCO(CH$_2$)mPhOH→
CH$_2$=CHO(CH$_2$)nOCO(CH$_2$)mPhOH (X: halogen atom)  (5)

Synthesis can be carried out as a condensation reaction of ω-halogenoalkyl vinyl ether such as 2-chloroethyl vinyl ether with 4-hydroxybenzoic acid, 4-hydroxyphenylacetic acid or the like in the presence of an aqueous solution of sodium hydroxide, etc. as a catalyst. Then, the reaction for —PhOH→—PhOR' can be carried out in the same manner as in (1).

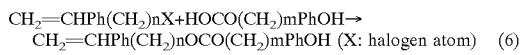

Synthesis can be carried out as a condensation reaction of halogenoalkylstyrene such as p-chloromethylstyrene with 4-hydroxybenzoic acid, 4-hydroxyphenylacetic acid or the like in the presence of a triethylamine catalyst, etc. Then, the reaction for —PhOH→—PhOR' can be carried out in the same manner as in (1).

These copolymers can be each further copolymerized with other vinyl monomers, olefin monomers, diene monomers, etc. to such an extent as not to deteriorate characteristics of the resulting copolymers (e.g. not more than about 40% by weight, preferably not more than about 20% by weight, on the basis of the resulting copolymer). The other vinyl monomers include, for example, alkoxyalkyl acrylates having an alkoxyalkyl group having 2 to 8 carbon atoms, such as methoxymethyl acrylate, ethoxymethyl acrylate, 2-methoxyethyl acrylate, 2-ethoxyethyl acrylate, 2-butoxyethyl acrylate, etc., cyanoalkyl acrylate, vinyl chloride, vinylidene chloride, acrylonitrile, styrene, vinyl acetate, ethyl vinyl ether, alkyl methacrylate, furfuryl acrylate, 2-acetoxyethyl acrylate, 2-propoxyethyl acrylate, 4-acetoxybutyl acrylate, 4-propoxybutyl acrylate, ethylene glycol dimethacrylate, etc. Furthermore, the copolymers can be each copolymerized with a cross-linkable group-containing vinyl monomer such as vinyl monochloroacetate, glycidyl methacrylate, acrylic acid, vinylsilyl group-containing acrylate, etc. The olefin monomers include, for example, ethylene, propylene, etc., and the diene monomers include, for example, divinylbenzene, isoprene, pentadiene, ethylidenenorbornene, etc.

Copolymerization reaction can be carried out in the presence of an ordinary radical polymerization initiator by any one of emulsion polymerization, suspension polymerization, solution polymerization, bulk polymerization, etc., preferably by emulsion polymerization. A redox polymerization initiator can be also used. In the resulting acrylic copolymer elastomer, about 50 to about 90% by weight of above-mentioned component of (a) to (c) and about 30 to about 90% by weight of above-mentioned component of (1) to (6) are copolymerized at a degree of polymerization of, for example, 90%. The acrylic copolymer elastomer has a Mooney viscosity (100° C.) of generally about 10 to about 100 pts, preferably about 20 to about 60 pts.

The acrylic copolymer elastomer (acrylic rubber) is blended with a fluorine-containing elastomer (fluorine rubber) in a blend ratio of acrylic rubber to fluorine rubber of about 90 to about 10:about 10 to about 90% by weight, preferably 80 to 20:20 to 80% by weight, the sum total being 100% by weight. The blend rubber within the above-mentioned ratio range shows an intermediate heat resistance between the heat resistance of acrylic rubber and that of fluorine rubber, and also has a good cold resistance. Blending can be carried out by any of a kneading method using an open roll, a mixer or the like, a method of mixing in a latex state and then coprecipitation by salting-out or the like and a method of mixing in a solution state and solvent removal, etc.

The fluorine-containing elastomer for use in the blending is vinylidene fluoride copolymer rubbers including, for example, terpolymer rubber of vinylidene fluoride—hexafluoropropene—tetrafluoroethylene, copolymer rubber of vinylidene fluoride—hexafluoropropene, terpolymer rubber of vinylidene fluoride—tetrafluoroethylene—chlorotrifluoroethylene, copolymer rubber of vinylidene fluoride—chlorotrifluoroethylene, terpolymer rubber of vinylidene fluoride—tetrafluoroethylene—propylene, etc. Besides, copolymer rubber of tetrafluoroethylene—propylene etc. can be also used. These fluorine-containing elastomers may be copolymer elastomers obtained by copolymerization in the presence of a saturated or unsaturated compound containing at least one of bromine and iodine.

The resulting blend rubber can be formed into a vulcanizable blend rubber composition by adding a quaternary onium salt and acid acceptor thereto.

As a quaternary onium salt, about 0.1 to about 30 parts by weight, preferably about 1 to about 20 parts by weight, of at least one of an ammonium salt and a phosphonium salt represented by the following general formulae can be used per 100 parts by weight of blend rubber. Below about 0.1 parts by weight, no vulcanization products having desired properties can be obtained, whereas above 30 parts by weight vulcanization products have a smaller stretchability and are less practical:

$$(R_1R_2R_3R_4N)^+X^-$$

$$(R_1R_2R_3R_4P)^+X^-$$

where $R_1$ to $R_4$ are each an alkyl group having 1 to 25 carbon atoms, an alkoxy group, an aryl group, an alkylaryl group, an aralkyl group or a polyoxyalkylene group, or two or three of which may form a heterocyclic structure together with N or P; and $X^-$ is an anion such as $Cl^-$, $Br^-$, $I^-$, $HSO_4^-$, $H_2PO_4^-$, $RCOO^-$, $ROSO_2^-$, $RSO^-$, $ROPO_2H^-$, $CO_3^{--}$, etc.

Specifically, the quaternary onium salt includes, for example, quaternary ammonium salts such as tetraethylammonium bromide, tetrabutylammonium chloride, tetrabutylammonium bromide, tetrabutylammonium iodide, n-dodecyltrimethylammonium bromide, cetyldimethylbenzylammonium chloride, methylcetyldibenzylammonium bromide, cetyldimethylethylammonium bromide, octadecyltrimethylammonium bromide, cetylpyridinium chloride, cetylpyridinium bromide, cetylpyridinium iodide, cetylpyridinium sulfate, 1-benzylpyridinium chloride, 1-benzyl-3,5-dimethylpyridinium chloride, 1-benzyl-4-phenylpyridinium chloride, 1,4-dibenzylpyridinium chloride, 1-benzyl-4-(pyrrolidinyl)pyridinium chloride, 1-benzyl-4-pyridinopyridinium chloride, tetraethylammonium acetate, trimethylbenzylammonium benzoate, trimethylbenzylammonium-p-toluene sulfonate, trimethylbenzylammonium borate, 8-benzyl-1,8-diazabicyclo[5,4,0]-undec-7-enium chloride, 1,8-diazabicyclo[5,4,0]-undecen-7-methylammonium methosulfate, 5-benzyl-1,5-diazabicyclo[4,3,0]-5-nonenium chloride, 5-benzyl-1,5-diazabicyclo-[4,3,0]-5-nonenium bromide, 5-benzyl-1,5-diazabicyclo[4,3,0]-5-nonenium tetrafluoroborate, 5-benzyl-1,5-diazabicyclo[4,3,0]-5-nonenium hexafluorophosphate, etc., and quaternary phosphonium salts such as tetraphenylphosphonium chloride, triphenylbenzylphosphonium chloride, triphenylbenzylphosphonium bromide, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium bromide, trioctylethylphosphonium acetate, trioctylethylphosphonium dimethyl phosphate, tetraoctylphosphonium chloride, cetyldimethylbenzylphosphonium chloride, etc.

Besides these quaternary onium salt, the blend rubber vulcanization system contains an acid acceptor as an essential component to provide a vulcanizable blend rubber composition. As an acid acceptor, about 0.1 to about 30 parts by weight, preferably about 1 to about 20 parts by weight, of at least one of oxides and hydroxides of metals of divalency or higher valency such as calcium hydroxide, magnesium oxide, zinc oxide, titanium oxide, lead oxide, etc. is used per 100 parts by weight of blend rubber.

It is preferable that the vulcanization system further contains about 0.1 to about 5 parts by weight of aromatic carboxylic acid per 100 parts by weight of blend rubber. The aromatic carboxylic acid includes, for example, unsubstituted or substituted monocarboxylic acids or polycarboxylic acids such as benzoic acid, phthalic acid, terephthalic acid, methylbenzoic acid, chlorobenzoic acid, nitrobenzoic acid, hydroxybenzoic acid, etc. Preferably, benzoic acid is used. These aromatic carboxylic acids can be also used as equimolar molecule compounds with the quaternary phosphonium salt (see JP-B-59-23577).

It is known that when benzoic acid is added to a belend rubber of acrylic copolymer elastomer and fluorine-containing elastomer, the anti-scorching property can be improved (see JP-A-58-63740). In other words, the addition of benzoic acid shows an action to lower the cross-linking rate, whereas in the case of blending the present acrylic copolymer elastomer with fluorine-containing elastomer, the addition of benzoic acid can effectively improve the cross-linking rate in contrast to the ordinary knowledge.

The present blend rubber composition can contain, besides the above-mentioned essential components, other additives, such as a reinforcing agent, a filler, an antioxidant, a stabilizer, a plasticizer, a lubricant, etc., if required and can be prepared by kneading with an open roll mixer, a Banbury mixer, a kneader, etc. and vulcanized (cocross-linked) by press vulcanization (press cure) at a temperature of about 150 to about 220° C. for about one to about 30 minutes and by gear oven vulcanization (post cure) at a temperature of about 150 to about 220° C. for about 2 to about 70 hours.

According to the present invention, cocross-linked vulcanization products having an intermediate heat resistance between the heat resistance of acrylic rubber and that of fluorine rubber and a improved cold resistance can be provided by blending the present novel acrylic copolymer elastomer (acrylic rubber) with fluorine-containing rubber (fluorine rubber).

PREFERRED EMBODIMENTS OF THE INVENTION

The present invention will be described in detail below, referring to Examples.

REFERENCE EXAMPLE 1

(Synthesis of 4-acetoxybutyl acrylate)

144.7 g of 4-hydroxybutyl acrylate and 118.7 g of pyridine were charged into a separable flask having a capacity of 1 liter, provided with a stirrer, a Jean-stark water separator, a cooling tube and a nitrogen gas inlet tube, and then 127.8 g of acetic anhydride was dropwise added thereto at 5° C. with stirring over 2 hours, while replacing the flask inside atomosphere with a nitrogen gas. After the dropwise addition, stirring was continued for one hour to conduct reaction. After completion of the reaction, the reaction mixture was recovered by filtration, washed successively with 0.5N hydrochloric acid, an aqueous 2.5% NaHCO$_3$ solution and water, and dehydrated over sodium sulfate.

Then pyridine was distilled off under reduced pressure, whereby 142 g of a product of the following chemical formula was obtained:

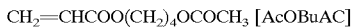

REFERENCE EXAMPLE 2

(Synthesis of ethylated acrylic acid caprolactone ester)

260 g of toluene, 300 g of acrylic acid caprolactone ester represented by the following general-formula:

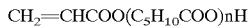

(Aronix M-5300, trademark of a product made by Toa Gosei K. K., Japan, which is a mixture of n=1 and n=2 and average n=1.5), 52 g of ethanol, 3 g of methoquinone and 3 g of p-toluenesulfonic acid were charged into a separable flask of the same type as used in Reference Example 1 and subjected to reaction at 85° C. for 4 hours, while replacing the flask inside atomosphere with a nitrogen gas. Then, the reaction mixture was washed successively with an aqueous 20% sodium hydroxide solution, water and an aqueous 20% sodium chroride solution. Toluene was distilled off under reduced pressure, whereby 100 g of a product of the following chemical formula was obtained:

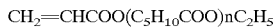

REFERENCE EXAMPLE 3

(Synthesis of 4-hydroxybenzyl acrylate)

1400 g of methyl isobutyl ketone, 50 g of 4-hydroxybenzyl alcohol and 40 g of triethylamine were charged into a separable flask having a capacity of 3 liters, provided with a stirrer and a nitrogen gas feed tube, and deaerated for 30 minutes, and then 33 g of acrylic acid chloride was dropwise added thereto at 3° C. over 50 minutes. Then, stirring was continued at room temperature for 3 hours. After completion of the reaction, the reaction mixture was recovered by filtration. The filtrate was washed with 0.5N hydrochloric acid and with water, dehydrated over anhydrous sodium sulfate, and then subjected to silica gel column chromatography (eluent: n-hexane/ethyl acetate= 10/1 by volume) to obtain the desired fraction. By distilling off the methyl isobutyl ketone solvent from the fraction under reduced pressure, 15 g of 4-hydroxybenzyl acrylate of the following chemical formula was obtained (yield: 26%):

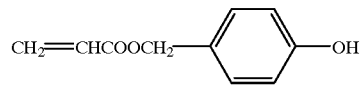

REFERENCE EXAMPLE 4

(Synthesis of 4-acetoxybenzyl acrylate)

1400 g of isopropyl ether, 100 g of 4-hydroxybenzyl acrylate and 53 g of pyridine were charged into a separable flask of the same type as used in Reference Example 3, and the flask inside gas was replaced with a nitrogen gas over 30 minutes, while ice cooling the flask. Then, 125 g of acetic anhydride was dropwise added thereto at 3° C. over 2 hours, and stirring was continued at room temperature for 3 hours.

After completion of the reaction, the reaction mixture was washed with 0.5N hydrochloric acid and then with water. By distilling off isopropyl ether from the reaction mixture, 113 g of 4-acetoxybenzyl acrylate of the following chemical formula was obtained (yield:91%):

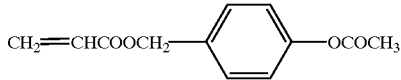

[AcOBAC]

REFERENCE EXAMPLE 5

(Synthesis of p-trimethylsilyloxybenzyl acrylate)

1500 g of methyl isobutyl ketone and 100 g of 4-hydroxybenzyl acrylate were charged into a separable flask of the same type as used in Reference Example 3, and cooled to −5° C. while replacing the flask inside gas with a nitrogen gas, and then 67 g of trimethylchlorosilane was dropwise added thereto over one hour, and then stirring was continued for 2 hours. After completion of the reaction, the reaction mixture was washed with water and methyl isobutyl ketone was distilled off, whereby 83 g of p-trimethylsilyloxybenzyl acrylate of the following chemical formula was obtained (yield: 59%):

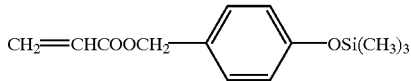

[TMSiOBAC]

REFERENCE EXAMPLE 6

(Synthesis of p-hydroxybenzoyloxybutyl acrylate)

2000 g of dichloromethane, 40.0 g of 4-hydroxybenzoic acid, 39.6 g of 4-hydroxybutyl acrylate and 0.05 g of methoquinone were charged into a separable flask of the same type as used in Reference Example 3, and then a liquid mixture consisting of 54.0 g of N,N'-dicyclohexylcarbodiimide, 5.9 g of dimethylaminopyridine and 60 g of dichloromethane was dropwise added thereto at room temperature over 4 hours, while replacing the flask inside gas with a nitrogen gas. After the same treatment as in Reference Example 1, 3.8 g of p-hydroxybenzoyloxybutyl acrylate of the following chemical formula was obtained (yield: 5%):

[HBOBAC]

CH$_2$=CHCOOCH$_2$CH$_2$CH$_2$CH$_2$OCO—⟨benzene⟩—OH

REFERENCE EXAMPLE 7

(Synthesis of vinyl 4-hydroxybenzoate)

2000 g of dichloromethane, 24.9 g of vinyl acetate, 40.0 g of 4-hydroxybenzoic acid, 0.79 g of palladium acetate and 3.5 g of potassium acetate were charged into a separable flask of the same type as used in Reference Example 3 and subjected to reaction at 50° C. for 6 hours, while replacing the flask inside atomosphere with a nitrogen gas. After completion of the reaction, the reaction mixture was washed successively with an aqueous 0.5N sodium carbonate solution and water, and then treated in th same manner as in Reference Example 3, whereby 4.8 g of vinyl 4-hydroxybenzoate having the following chemical formula was obtained (yield: 10%):

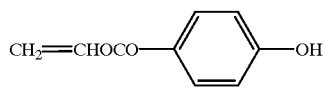

[VHB]

REFERENCE EXAMPLE 8

(Synthesis of vinyl p-hydroxybenzoyloxy acetate)

1500 g of methyl isobutyl ketone, 69 g of 4-hydroxybenzoic acid and 58.0 g of triethylamine were charged into a separable flask of the same type as used in Reference Example 3, and heated to 80° C., while replacing the flask inside gas with a nitrogen gas, and then 57 g of vinyl monochloroacetate was dropwise added thereto over 2 hours, and then stirring was continued for 6 hours. After completion of the reaction, the reaction mixture was washed with water and dehydrated over anhydrous sodium sulfate. After the same treatment as in Reference Example 1, 34.8 g of vinyl p-hydroxybenzoyloxy acetate of the following chemical formula was obtained (yield: 60%):

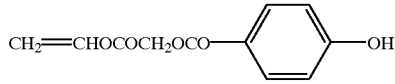

[HBOVAc]

REFERENCE EXAMPLE 9

(Synthesis of p-hydroxybenzoyloxyethyl vinyl ether)

Reaction was carried out in the same manner as in Reference Example 8, except that 45.3 g of 2-chloroethyl vinyl ether was used in place of vinyl monochloroacetate and 280 g of an aqueous 10% sodium hydroxide solution was used in place of triethylamine, whereby 29.6 g of p-hydroxybenzoyloxyethyl vinyl ether of the following chemical formula was obtained (yield: 28%):

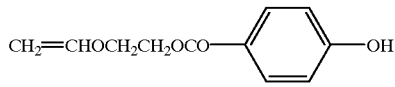

[HBOEVE]

REFERENCE EXAMPLE 10

(Synthesis of p-hydroxybenzoyloxymethylstyrene)

Reaction was carried out in the same manner as in Reference Example 8, except that 72.4 g of p-chloromethylstyrene was used in place of vinyl monochloroacetate. After completion of the reaction 3 liters of water was added to the reaction mixture and the precipitated powder was recovered therefrom and washed with n-hexane, whereby 36.2 g of p-hydroxybenzoyloxymethylstyrene of the following chemical formula was obtained (yield: 30%):

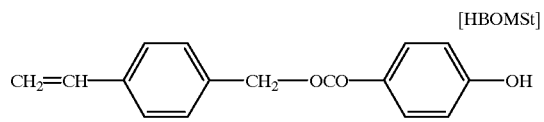

[HBOMSt]

EXAMPLE 1

The following compounds were charged into a separable flask having a capacity of 3 liters, provided with a stirrer, a nitrogen gas feed tube and a depressurizing means:

| Ethyl acrylate | 250 g |
| --- | --- |
| n-Butyl acrylate | 150 g |
| AcOBuAC of Reference Example 1 | 100 g |
| HBAC of Reference Example 3 | 25 g |
| Sodium laurylsulfate | 27.5 g |
| Water | 750 g |

After repetitions of deaeration and nitrogen gas replacement to completely remove oxygen from the flask, a polymerization initiator mixture consisting of the following compounds was added thereto to start polymerization reaction at room temperature:

| Sodium hydrosulfite | 0.05 g |
| --- | --- |
| Sodium formaldehyde sulfoxylate | 0.01 g |
| t-Butyl hydroperoxide | 0.025 g |

Then, the reaction was continued at 50° C. for 6 hours until the polymerization conversion reached to 90%. The resulting latex was coagulated, thoroughly washed with water and dried, whereby acrylic copolymer elastomer A having Mooney viscosity (100° C.) of 42 pts and a HBAC copolymerization ratio of 4.1% by weight (determined by $^1$H-NMR) was obtained.

EXAMPLES 2 TO 11

Copolymerization reaction was carried out in the same manner as in Example 1, using monomer charge compositions given in the following Table 1, and acrylic copolymer elastomers B to K were obtained.

TABLE 1

| Example No. | 2 | 3 | 4 | 5 | 6 | 7 | 8 | 9 | 10 | 11 |
| --- | --- | --- | --- | --- | --- | --- | --- | --- | --- | --- |
| [Monomer; g] | | | | | | | | | | |
| Ethyl acrylate | 50 | 200 | | 125 | 150 | 150 | 150 | 150 | 150 | 150 |
| n-Butyl acrylate | 250 | 250 | 250 | 250 | 250 | 250 | 250 | 250 | 250 | 250 |
| 2-Methoxyethyl acrylate | | | 150 | | | | | | | |
| AcOBuAC of Ref. Ex. 1 | 200 | 50 | 100 | | 100 | 100 | 100 | 100 | 100 | 100 |
| Styrene | | | | 25 | | | | | | |
| HBAC of Ref. Ex. 3 | 25 | 25 | 25 | 25 | | | | | | |
| AcOBAC of Ref. Ex. 4 | | | | | 25 | | | | | |
| HBOBAC of Ref. Ex. 6 | | | | | | 25 | | | | |
| VHB of Ref. Ex. 7 | | | | | | | 25 | | | |
| HBOVAc of Ref. Ex. 8 | | | | | | | | 25 | | |
| HBOEVE of Ref. Ex. 9 | | | | | | | | | 25 | |
| HBOMSt of Ref. Ex. 10 | | | | | | | | | | 25 |
| [Copolymer elastomer] | | | | | | | | | | |
| Abbreviation | B | C | D | E | F | G | H | I | J | K |
| Mooney viscosity (pts, 100° C.) | 24 | 32 | 22 | 29 | 33 | 27 | 26 | 29 | 30 | 26 |
| Copoly. ratio of components of Ref. Ex. 3 to 10 (%) | 3.8 | 3.9 | 3.1 | 3.3 | 3.2 | 3.1 | 3.1 | 3.2 | 3.0 | 2.9 |

EXAMPLES 12 TO 14

Copolymerization reaction was carried out in the same manner as in Example 1, using charged monomer composition as shown in the following Table 2, whereby acrylic copolymer elastomers L to N were obtained:

TABLE 2

| Example No. | 12 | 13 | 14 |
| --- | --- | --- | --- |
| [Monomer; g] | | | |
| Ethyl acrylate | 150 | 150 | 150 |
| n-Butyl acrylate | 250 | 250 | 250 |
| Methylate M-5300 of Ref. Ex. 2 | 100 | | |
| FA2DAC *) (trademark of a product made by Daicel Kagaku K. K., Japan) | | 100 | 100 |
| HBAC of Ref. Ex. 3 | 25 | 25 | |
| TMSiOBAC of Ref. Ex. 5 | | | 25 |
| [Copolymer elastomer] | | | |
| Abbreviation | L | M | N |
| Mooney viscosity (pts, 100° C.) | 29 | 24 | 20 |
| Copoly. ratio of components of Ref. Ex. 3 to 5 (%) | 3.2 | 3.3 | 2.8 |

*) FA2DAC: $CH_2$=$CHCOOC_2H_4O(COC_5H_{10}O)nCOCH_3$ (mixture of n = 1, n = 2 and n = 3, and an average n = 2.1)

COMPARATIVE EXAMPLES 1 TO 4

Copolymerization reaction was carried out in the same manner as in Example 1, using monomer charge compositions as shown in the following Table 3, whereby acrylic copolymer elastomers P to S were obtained:

TABLE 3

| Comp. Ex. No. | 1 | 2 | 3 | 4 |
|---|---|---|---|---|
| [Monomer; g] | | | | |
| Ethyl acrylate | 250 | 150 | 250 | 150 |
| n-Butyl acrylate | 250 | 250 | 250 | 250 |
| 2-Methoxyethyl acrylate | | 100 | | |
| HBAC of Ref. Ex. 3 | 25 | 25 | | |
| FA2DAC (trademark of Daicel K. K., Japan) | | | | 100 |
| p-Chloromethylstyrene | | | 10 | 10 |
| [Copolymer elastomer] | | | | |
| Abbreviation | P | Q | R | S |
| Mooney viscosity (pts, 100° C.) | 42 | 40 | 45 | 26 |

REFERENCE EXAMPLE 11

(Production of VdF-HFP-TFE terpolymer rubber)

1500 ml of deionized water and 7.5 g of ammonium perfluorooctanoate were charged into an autoclave having a capacity of 3 liters, and after the autoclave inside gas was thoroughly replaced with a nitrogen gas, the autoclave was pressurized to an inside pressure of 8 kg/cm$^2$ gauge with a feed gas mixture of vinylidene fluoride (VdF)/hexafluoropropene (HFP)/tetrafluoroethylene (TFE) in a ratio of 22/66/12 by weight and then the autoclave inside temperature was elevated to 60° C. with stirring. Then, 3.5 g of ammonium persulfate dissolved in 50 ml of deionized water was added thereto under pressure. Then, a supplementary gas mixture of VdF/HFP/TFE in a ratio of 39/46/15 by weight was added thereto until the autoclave inside pressure reached 10 kg/cm$^2$ gauge to start polymerization. Immediately after the start of polymerization reaction, the autoclave inside pressure started to decrease, and when the autoclave inside pressure was lowered to 9 kg/cm$^2$ gauge, the autoclave was repressurized to 10 kg/cm$^2$ gauge with the latter gas mixture. The polymerization reaction was continued for 5 hours, while maintaining the autoclave inside pressure at a pressure of 9 to 10 kg/cm$^2$ gauge likewise. Then, the unreacted gas mixture was purged from the autoclave to discontinue the reaction. The thus obtained latex was coagulated, thoroughly washed with water and dried, whereby fluorine-containing elastomer A having a molar composition ratio of VdF/HFP/TFE=60/19/21 (determined by $^{19}$F-NMR analysis) and a Mooney viscosity of 74 pts was obtained.

REFERENCE EXAMPLE 12

In Reference Example 11, the feed gas mixture composition was changed to VdF/HFP in a ratio of 24.5/75.5 by weight and the supplementary gas mixture composition to VdF/HFP in a ratio of 63.5/36.5 by weight. Fluorine-containing elastomer B having a molar composition ratio of VdF/HFP=78/22 and a Mooney viscosity of 92 pts was obtained.

REFERENCE EXAMPLE 13

In Reference Example 11, the feed gas mixture composition was changed to VdF/HFP/TFE in a ratio of 27/57/16 by weight and the supplementary gas mixture composition to VdF/HFP/TFE in a ratio of 40/34/25 by weight. Furthermore, 4.4 g of 1-bromo-2-iodoperfluoroethane was added to the reaction mixture under pressure before the addition of the aqueous ammonium persulfate solution. Fluorine-containing elastomer C having a molar composition ratio of VdF/HFP/TFE=58/20/22 and a Mooney viscosity of 81 pts was obtained.

REFERENCE EXAMPLE 14

In Reference Example 11, the feed gas mixture composition was changed to VdF/HFP/CTFE (chlorotrifluoroethylene) in a ratio of 43/55/2 by weight and the supplementary gas mixture composition to VdF/HFP/CTFE in a ratio of 73/25.5/1.5 by weight. Fluorine-containing elastomer D having a molar composition ratio of VdF/HFP/CTFE=77/21.8/1.2 and a Mooney viscosity of 65 pts was obtained.

EXAMPLE 15

Acrylic copolymer elastomer A and fluorine-containing elastomer A were mixed in a ratio of 50:50 by weight by open roll (roll method), whereby blend rubber A having a Mooney viscosity of 38 pts was obtained.

EXAMPLE 16

Acrylic copolymer elastomer N and fluorine-containing elastomer A were mixed together in a ratio of 50:50 by weight by an open roll (roll method), whereby a blend rubber B having a Mooney viscosity of 41 pts was obtained.

EXAMPLE 17

Acrylic copolymer elastomer A and copolymer rubber of vinylidene fluoride/propylene (Aflus 200, trademark of a product made by Asahi Glass K. K., Japan) were mixed in a ratio of 50:50 by weight by roll method, whereby blend rubber C having a Mooney viscosity of 48 pts was obtained.

EXAMPLES 18 TO 35

Blend rubbers D to U were prepared by latex method of mixing a copolymer latex at the production stage of acrylic copolymer elastomer (acrylic rubber) and a copolymer latex at the production stage of fluorine-containing elastomer (fluorine rubber) in such ratios as to provide desired ratios of the acrylic rubber to the fluorine rubber by weight, as given in the following Table 2, and stirring the mixture for 30 minutes, followed by coagulated, thorough washing with water and drying.

TABLE 4

| Example No. | Acrylic rubber (parts by weight) | | Fluorine rubber (parts by weight) | | Blend rubber | Mooney viscosity (pts, 100° C.) |
|---|---|---|---|---|---|---|
| 18 | A | 50 | A | 50 | D | 38 |
| 19 | A | 75 | A | 25 | E | 32 |
| 20 | A | 25 | A | 75 | F | 47 |
| 21 | A | 50 | B | 50 | G | 29 |
| 22 | A | 50 | C | 50 | H | 33 |
| 23 | A | 50 | D | 50 | I | 38 |
| 24 | B | 50 | A | 50 | J | 30 |
| 25 | C | 50 | A | 50 | K | 42 |
| 26 | D | 50 | A | 50 | L | 27 |
| 27 | E | 50 | A | 50 | M | 35 |
| 28 | F | 50 | A | 50 | N | 38 |
| 29 | G | 50 | A | 50 | 0 | 35 |
| 30 | H | 50 | A | 50 | P | 41 |
| 31 | I | 50 | A | 50 | Q | 35 |
| 32 | J | 50 | A | 50 | R | 42 |
| 33 | K | 50 | A | 50 | S | 42 |
| 34 | L | 50 | A | 50 | T | 34 |
| 35 | M | 50 | A | 50 | U | 31 |

COMPARATIVE EXAMPLES 5 TO 10

Acrylic copolymer elastomers P to S and fluorine-containing elastomer A were mixed in various ratios by weight by latex method, whereby blend rubbers V to Z' were prepared.

The blend ratios of the copolymer elastomers used and the Mooney viscosity of the resulting blend rubbers are shown in the following Table 5.

TABLE 5

| | Comparative Example No. | | | | | |
|---|---|---|---|---|---|---|
| | 5 | 6 | 7 | 8 | 9 | 10 |
| Acrylic rubber P | 50 | 75 | 25 | | | |
| Acrylic rubber Q | | | | 50 | | |
| Acrylic rubber R | | | | | 50 | |
| Acrylic rubber S (parts by weight) | | | | | | 50 |
| Fluorine rubber A (parts by weight) | 50 | 25 | 75 | 50 | 50 | 50 |
| Blend rubber | V | W | X | Y | Z | Z' |
| Mooney viscosity (pts) | 48 | 33 | 68 | 49 | 52 | 35 |

EXAMPLES 36 TO 38

| | |
|---|---|
| Blend rubber A (roll method) | 100 parts by weight (Ex. 36) |
| Blend rubber B (roll method) | 100 parts by weight (Ex. 37) |
| Blend rubber C (roll method) | 100 parts by weight (Ex. 38) |
| Stearic acid | 1 parts by weight |
| Autioxidant *) (Nocrack CD, trademark of a product made by Ouchi-Shinko Kagaku K. K., Japan) | 2 parts by weight |
| MT carbon black | 30 parts by weight |
| Calcium hydroxide | 5 parts by weight |
| Magnesium oxide | 2 parts by weight |
| Benzyltriphenylphosphonium chloride | 0.4 parts by weight |

*) 4,4'-bis($\alpha$, $\alpha$-dimethylbenzyl)diphenylamine

The above components were kneaded by open roll and the resulting kneaded mixtures were subjected to press vulcanization (primary vulcanization) at 180° C. for 10 minutes and then to gear oven vulcanization (secondary vulcanization) at 180° C. for 24 hours. Vulcanization products were subjected to determination or observation for the following items according to JIS K-6301, whereby results as shown in the following Table 6 were obtained.

Physical properties: Measurement of hardness (Hs), 100% modulus (Mo 100), tensile strength ($T_B$) and elongation ($E_B$)

Heat aging test: Measurement of changes in the physical properties of the vulcanization products before and after heating at 200° C. for 70 hours Oil resistance test: change in volume after dipping in JIS No. 3 test oil at 150° C. for 70 hours Embrittling temperature: according to JIS K-6261

TABLE 6

| | | Physical properties | | | | | Heat aging | | |
|---|---|---|---|---|---|---|---|---|---|
| Ex. No. | Blend rubber | Hs (pts) | Mo 100 (MPa) | $T_B$ (MPa) | $E_B$ (%) | Oil res. (%) | Emb. temp. (° C.) | Hs (pts) | $T_B$ (%) | $E_B$ (%) |
| 36 | A | 48 | 1.9 | 5.4 | 220 | +19 | −23 | +5 | +10 | −32 |
| 37 | B | 45 | 1.2 | 5.2 | 330 | +20 | −26 | +9 | +8 | −27 |
| 38 | C | 49 | 1.3 | 4.9 | 330 | +19 | −22 | +6 | −10 | −22 |

EXAMPLES 39 TO 57

In Example 36, blend rubber D to U by latex method were used in place of blend rubber A by roll method, whereby results as shown in the following Table 7 were obtained. In Example 57, 0.5 parts by weight of benzoic acid was additionally added to the vulcanization system.

TABLE 7

| Ex. No. | Blend rubber | Hs (pts) | Mo 100 (MPa) | $T_B$ (MPa) | $E_B$ (%) | Oil res. (%) | Emb. temp. (°C.) | Heat aging Hs (pts) | $T_B$ (%) | $E_B$ (%) |
|---|---|---|---|---|---|---|---|---|---|---|
| 39 | D | 48 | 1.6 | 5.5 | 260 | +19 | −23 | +6 | +13 | −30 |
| 40 | E | 40 | 0.6 | 3.2 | 390 | +22 | −24 | +13 | +30 | −38 |
| 41 | F | 57 | 2.0 | 4.8 | 290 | +10 | −18 | +6 | +2 | −4 |
| 42 | G | 47 | 1.5 | 5.3 | 290 | +19 | −20 | +10 | +8 | −13 |
| 43 | H | 48 | 1.4 | 5.5 | 300 | +19 | −22 | +8 | −8 | −20 |
| 44 | I | 47 | 1.4 | 5.2 | 270 | +19 | −20 | +10 | −15 | −38 |
| 45 | J | 46 | 1.1 | 4.7 | 280 | +19 | −26 | +10 | +4 | −15 |
| 46 | K | 48 | 1.6 | 6.2 | 280 | +17 | −21 | +9 | +7 | −16 |
| 47 | L | 46 | 1.6 | 4.9 | 180 | +18 | −26 | +15 | +5 | −28 |
| 48 | M | 50 | 1.3 | 5.0 | 210 | +22 | −20 | +9 | −8 | −18 |
| 49 | N | 47 | 0.9 | 4.1 | 240 | +19 | −22 | +8 | +2 | −25 |
| 50 | O | 48 | 1.7 | 5.2 | 290 | +20 | −23 | +10 | +15 | −10 |
| 51 | P | 47 | 1.4 | 5.2 | 290 | +20 | −23 | +10 | +8 | −40 |
| 52 | Q | 46 | 1.8 | 5.4 | 300 | +19 | −22 | +9 | −10 | −26 |
| 53 | R | 48 | 1.4 | 5.5 | 270 | +19 | −22 | +9 | −2 | −18 |
| 54 | S | 49 | 1.7 | 5.7 | 310 | +19 | −23 | +8 | +16 | −22 |
| 55 | T | 45 | 1.4 | 5.6 | 300 | +19 | −25 | +8 | +4 | −20 |
| 56 | U | 46 | 1.4 | 5.6 | 250 | +19 | −25 | +8 | 0 | −22 |
| 57 | S | 60 | 2.5 | 6.2 | 260 | +19 | −21 | +5 | +2 | −30 |

COMPARATIVE EXAMPLES 11 TO 16

In Example 36, blend rubber V to Z' by latex method were used in place of blend rubber A by roll method, whereby results as shown in the following Table 8 were obtained. In Comparative Example 12, 60 parts by weight of HAF carbon black was used in place of 30 parts by weight of MT carbon black and in Comparative Examples 15 and 16, one part by weight of bisphenol AF was further added to the vulcanization system. In Comparative Example 16, the press vulcanization condition was changed to 180° C. for 8 minutes.

TABLE 8

| Comp. Ex. No. | Blend rubber | Hs (pts) | Mo 100 (MPa) | $T_B$ (MPa) | $E_B$ (%) | Oil res. (%) | Emb. temp. (°C.) | Heat aging Hs (pts) | $T_B$ (%) | $E_B$ (%) |
|---|---|---|---|---|---|---|---|---|---|---|
| 11 | V | 50 | 1.8 | 7.1 | 260 | +20 | −18 | +4 | +12 | −20 |
| 12 | W | 40 | 0.7 | 3.2 | 540 | +29 | −20 | +15 | −50 | −70 |
| 13 | X | 59 | 0.9 | 4.8 | 300 | +10 | −17 | +6 | +8 | −20 |
| 14 | Y | 51 | 2.1 | 5.4 | 190 | +13 | −18 | +10 | −30 | −25 |
| 15 | Z | 57 | 2.8 | 8.1 | 250 | +20 | −18 | +6 | −37 | −36 |
| 16 | X' | 50 | 1.6 | 6.1 | 230 | +20 | −23 | +13 | −28 | −52 |

What is claimed is:

1. A blend rubber which comprises a fluorine-containing elastomer and an acrylic copolymer elastomer, which comprises a copolymer of:

[I] an alkyl acrylate having an alkyl group having 1 to 8 carbon atoms;

[II] (a) an acylated ω-hydroxyalkyl (meth)acrylate, represented by the following general formula:

$$CH_2=CRCOOR_2OCOR_1$$

where R is a hydrogen atom or a methyl group; $R_1$ is a lower alkyl group; and $R_2$ is an alkylene group having 2 to 20 carbon atoms, (b) a terminally alkylated (meth)acrylic acid lactone ester, represented by the following general formula:

$$CH_2=CRCO[O(CH_2)pCO]qOR_1$$

where R is a hydrogen atom or a methyl group; $R_1$ is a lower alkyl group; p is an integer of 2 to 20; and q is an integer of 1 to 20, or (c) a terminally acylated (meth)acrylic acid lactone ester, represented by the following general formula:

$$CH_2=CRCOOR_2O[CO(CH_2)pO]qCOR_1$$

where R is a hydrogen atom or a methyl group; $R_1$ is a lower alkyl group; $R_2$ is an alkylene group having 2 to 20 carbon atoms, p is an integer of 2 to 20; and q is an integer of 1 to 20; and

[III] an unsaturated ester compound having a hydroxyphenyl group, an acetoxyphenyl group or a trialkylsilyloxy group as a terminal group.

2. A blend rubber according to claim 1, wherein the acrylic copolymer elastomer and the fluorine-containing elastomer are blended in a ratio of 10 to 90:90 to 10 by weight.

3. A vulcanizable blend rubber composition which comprises a blend rubber of claim 1, a quaternary onium salt and an acid acceptor.

4. A vulcanizable blend rubber composition according to claim 3, where the quaternary onium salt is a quaternary ammonium salt represented by the following general formula:

$$(R_1R_2R_3R_4N)^+X^-$$

or a quaternary phosphonium salt represented by the following general formula:

$$(R_1R_2R_3R_4P)^+X^-$$

where $R_1$ to $R_4$ are each an alkyl group having 1 to 25 carbon atoms, an alkoxy group, an aryl group, an alkylaryl group, an aralkyl group or a polyoxyalkylene group, or two or three of which may form a heterocyclic structure together with N or P; and $X^-$ is an anion.

5. A vulcanizable blend rubber composition according to claim 3, wherein about 0.1 to about 30 parts by weight of the quaternary onium salt is contained per 100 parts by weight of the blend rubber.

6. A vulcanizable blend rubber composition according to claim 3, wherein the acid acceptor is an oxide or hydroxide of a metal having a divalency or higher valency.

7. A vulcanizable blend rubber composition according to claim 3, wherein about 0.1 to about 30 parts by weight of the acid acceptor is contained per 100 parts by weight of the blend rubber.

8. A vulcanizable blend rubber composition according to claim 3, wherein an aromatic carboxylic acid is further contained.

9. A vulcanizable blend rubber composition according to claim 8, wherein the aromatic carboxylic acid is benzoic acid.

10. A vulcanizable blend rubber composition according to claim 8, wherein about 0.1 to about 5 parts by weight of the aromatic carboxylic acid is contained per 100 parts by weight of the blend rubber.

* * * * *

UNITED STATES PATENT AND TRADEMARK OFFICE
CERTIFICATE OF CORRECTION

PATENT NO. : 5,959,037
DATED : September 28, 1999
INVENTOR(S) : Kuniyoshi Saito, Iwao Moriyama and Jun Okabe It is certified that error appears in the above-identified patent and that said Letters Patent is hereby corrected as shown below:

On the title page, item [57],

Abstract, line 2, change "$CH_a= ...$" -- to $CH_2= ...$ --.

Abstract, line 4 change "$[CO(CH_2) ...$" to -- $O[CO(CH_2) ...$ --.

Column 6, line 24, change "$...)^{+x-}$" to -- $...)^+X^-$ --.

Column 6, line 25, change "$...)^{+x-}$" to -- $...)^+X^-$ --.

Signed and Sealed this

Twenty-first Day of November, 2000

Attest:

Q. TODD DICKINSON

*Attesting Officer*  *Director of Patents and Trademarks*